US011692254B2

United States Patent
Hammock et al.

(10) Patent No.: US 11,692,254 B2
(45) Date of Patent: Jul. 4, 2023

(54) HEAT RESISTANT DURABLE HIGH ENTROPY ALLOY COMPOSITIONS

(71) Applicant: Weld Mold Co., Brighton, MI (US)

(72) Inventors: Darryl Hammock, Brighton, MI (US); Prabir Chaudhury, Phoenix, AZ (US)

(*) Notice: Subject to any disclaimer, the term of this patent is extended or adjusted under 35 U.S.C. 154(b) by 0 days.

(21) Appl. No.: 17/466,357

(22) Filed: Sep. 3, 2021

(65) Prior Publication Data

US 2021/0395871 A1     Dec. 23, 2021

Related U.S. Application Data

(63) Continuation-in-part of application No. 16/522,359, filed on Jul. 25, 2019, now abandoned.

(60) Provisional application No. 62/703,047, filed on Jul. 25, 2018.

(51) Int. Cl.
| | |
|---|---|
| *C22C 38/58* | (2006.01) |
| *C22C 38/46* | (2006.01) |
| *C22C 38/44* | (2006.01) |
| *C22C 38/54* | (2006.01) |
| *C22C 38/50* | (2006.01) |
| *B23K 35/30* | (2006.01) |
| *B23K 35/02* | (2006.01) |
| *C22C 38/52* | (2006.01) |
| *C22C 38/06* | (2006.01) |
| *B23K 101/32* | (2006.01) |
| *B23K 103/02* | (2006.01) |

(52) U.S. Cl.
CPC .......... *C22C 38/58* (2013.01); *B23K 35/0261* (2013.01); *B23K 35/3086* (2013.01); *C22C 38/06* (2013.01); *C22C 38/44* (2013.01); *C22C 38/46* (2013.01); *C22C 38/50* (2013.01); *C22C 38/52* (2013.01); *C22C 38/54* (2013.01); *B23K 2101/32* (2018.08); *B23K 2103/02* (2018.08)

(58) Field of Classification Search
None
See application file for complete search history.

(56) References Cited

U.S. PATENT DOCUMENTS

| | | | |
|---|---|---|---|
| 2014/0261918 A1* | 9/2014 | Jin | G01N 17/046 148/333 |
| 2014/0332517 A1* | 11/2014 | Barhorst | B23K 35/222 219/146.1 |

OTHER PUBLICATIONS

B.S. Murty, J.W. Yeh, S. Ranganathan, "High-Entropy Alloys" Chapter 2: High-Entropy Alloys: Basic Concepts, Elsevier Inc., 2014 ISBN 978-0-12-800251-3.

Daniel B. Miracle, Jonathan D. Miller, Oleg N. Senkov, Christopher Woodward, Michael D. Uchic and Jaimie Tiley, "Exploration and Development of High Entropy Alloys for Structural Applications," Entropy 2014, 16, 494-525; doi:10.3390/e16010494, ISSN 1099-4300.

D.B. Miracle and O.N. Senkov, "A critical review of high entropy alloys and related concepts," Elsevier Acta Materialia 122 (2017) 448-511.

\* cited by examiner

*Primary Examiner* — Brian D Walck
(74) *Attorney, Agent, or Firm* — Law Offices of John G. Posa

(57) ABSTRACT

Novel High-Entropy Alloy (HEA) compositions are particularly suited to welding applications. The mixtures contain at least the elements nickel, manganese, cobalt, chromium, vanadium, molybdenum, and iron. The % weight of the constituents varies in accordance with the detailed description contained herein, with tolerances in the range of ±4% for major alloying elements and ±1% for minor alloying elements. The mixture may also contain a small amount of Aluminum, Titanium, and Boron with a tolerance in the range of +/−1% or, more preferably, +/−0.5% In accordance with the invention, the compositions above may be integrated into HEA welding products using cored wire and welding electrode manufacturing techniques, preferably starting with vacuum melted rolled alloys. One manufacturing process uses the compositions as an alloyed strip formed around the appropriate ground/crushed alloys to make commercially viable fabricated welding products.

8 Claims, No Drawings

HEAT RESISTANT DURABLE HIGH ENTROPY ALLOY COMPOSITIONS

REFERENCE TO RELATED APPLICATIONS

This application is a continuation-in-part of U.S. patent application Ser. No. 16/522,359, filed Jul. 25, 2019, which claims the benefit of U.S. Provisional Patent Application Ser. No. 62/703,047, filed Jul. 25, 2019, the entire content of all Related Applications being incorporated herein by reference.

FIELD OF THE INVENTION

This invention relates generally to High Entropy Alloys and, more particularly, to novel alloy compositions suitable for applications where high temperature resistance along with mechanical and chemical durability are of prime importance.

BACKGROUND OF THE INVENTION

There is no universally agreed-upon definition of a "High Entropy Alloy" or HEA. Basically, an HEA is an alloy with multiple elements (typically 5 or more) in approximately equal atomic proportions. These metal alloys differ from standard alloys that predominantly contain large amount of one or few elements with low or medium entropy. With 45 structural metal elements in the periodic table, one million HEA's are possible when five elements are picked. But not all HEAs provide the same level of engineering value. The elements typically exhibit an atomic concentration between 5 and 35 atomic percent, and may contain minor elements below 5 atomic percent.

Although HEAs have existed since before 2004, research substantially accelerated in the 2010. An overview of HEAs may be found at: Tsai, Ming-Hung, and Jien-Wei Yeh. *High-entropy alloys: a critical review.* Materials Research Letters 2.3 (2014): 107-123, ("Yeh," incorporated herein by reference). While Yeh originally defined HEAs as alloys containing at least 5 elements with concentrations between 5 and 35 atomic percent, later research suggested that this definition could be expanded to include alloys that form a solid solution with intermetallic phases and quasicrystalline or even amorphous materials such as metallic glasses.

HEAs are currently the focus of significant attention in materials science and engineering because they have highly desirable engineering properties. Some HEAs have considerably better strength-to-weight ratios, with a higher degree of favorable fracture toughness and tensile strength combination, very high temperature resistance, as well as corrosion and oxidation resistance than conventional alloys.

As discussed in *High Entropy Alloys: Development and Applications* Steadyman Chikumba and Veeredhi Vasudevea Rao, Nov. 26-27, 2015 Irene, Pretoria (South Africa), due to their low density and high strength, HEAs find application in transportation and energy industries requiring high performance, reliability and endurance in extreme operating conditions. HEAs can be used to protect the surface of machine components and tools because of their high hardness, wear resistance, high-temperature softening resistance, anti-corrosion, and combinations of these properties. HEAs may further be used as coatings for food preservation and cookware due to anticorrosion, anti-oxidation and wear resistance properties. There is also a wider scope for the application of heat resistant, durable HEAs.

SUMMARY OF THE INVENTION

This invention resides in novel High Entropy Alloy (HEA) compositions particularly suited to welding applications. In accordance with some preferred embodiments, the mixture contains at least the elements Nickel (Ni), Manganese (Mn), Cobalt (Co), Chromium (Cr), Vanadium (V), Molybdenum (Mo), and Iron (Fe). The % weight of the constituents vary in accordance with the detailed description contained herein, with tolerances in the range of +/−4% and, in some cases, +/−1% as indicated in the compositions.

In alternative embodiments, the mixture may contain a small amounts of aluminum, titanium, and boron with a tolerance in the range of +/−0.1% or, more preferably, +/−0.05%

In accordance with the invention, the compositions may be integrated into HEA welding products using cored wire and welding electrode manufacturing techniques, preferably starting with vacuum melted rolled alloys. One manufacturing process uses the compositions as an alloyed strip formed around the appropriate ground/crushed alloys to make commercially viable fabricated welding products.

DETAILED DESCRIPTION OF THE INVENTION

In broad and general terms, this invention resides in various HEA alloy compositions specifically for welding applications. Table I, below, lists one alloy composition applicable to the invention. Note that the tolerance for each element is shown in the table according to their role in the alloy. For example, the major alloying elements (Mn, Cr, Ni, and Co) vary within +/−4 wt. %, while the minor elements (V, Mo and Nb) vary within +/−1 wt. %.

Major alloying elements (Ni, Mn, Cr, and Co) in this alloy provide solid solution strengthening with specific characteristics of each element in the formulation. Ni and Mn are austenite (an FCC phase) stabilizers, and act similar to those in austenitic stainless steel. Cr provides high temperature oxidation resistance and corrosion resistance for specific applications. Co provides high temperature resistance, similar to those in many heat resistant superalloys.

Minor alloying elements (Mo, V, and Nb) on the other hand, preferably attach with impurities like Carbon (C) and Nitrogen (N) to form stable carbides and carbonitrides to provide additional strengthening. Additional special purpose alloying elements such as Ti, Al, and B provide added strengthening as required to enhance strengthening at elevated temperatures by forming intermetallic compounds such as titanium aluminides or titanium boride.

To determine optimum compositions for different applications, we measure room temperature and elevated temperature hardness and tensile properties. This allows us to determine the best combinations for (1) high temperature strength and room temperature ductility for forging an die casting applications; (2) room temperature strength and ductility for structural applications; (3) high temperature strength and creep resistance for engine applications; and possibly (4) elevated temperature strength and corrosion resistance for gas and oil applications.

TABLE I

Heat Resistant Durable High Entropy Alloy Elemental Composition, wt. %

| Mn | Cr | Ni | Co | V | Mo | Fe |
|---|---|---|---|---|---|---|
| 15 ± 4 | 17 ± 4 | 13 ± 4 | 10 ± 4 | 3 ± 1 | 3 ± 1 | Bal |

In accordance with the invention, the embodiments above are integrated into HEA welding products using cored wire and welding electrode manufacturing techniques, preferably starting with vacuum melted rolled alloys. One manufacturing process uses the compositions as an alloyed strip formed around the appropriate ground/crushed alloys to make commercially viable fabricated welding products.

The invention claimed is:

1. A high-entropy alloy, including the following amounts of the elements by percent weight, each with a tolerance in the range shown below:
   13±4 Nickel,
   15±4 Manganese,
   10±4 Cobalt,
   17±4 Chromium,
   3±1 Vanadium,
   3±1 Molybdenum, and
   39±4 Iron.

2. The high-entropy alloy of claim 1, further including 3±1 wt % Niobium.

3. The high-entropy alloy of claim 1, further including 0.05 to 0.35 wt % Titanium and 0.05 to 0.25 wt % Aluminum.

4. The high-entropy alloy of claim 1, further including the following amounts of elements by percent weight:
   0.2 to 0.3% Titanium
   0.02 to 0.1% Boron.

5. The high-entropy alloy of claim 1, further including the following amounts of elements by percent weight:
   0.2 to 0.3% Titanium
   0.02 to 0.1% Boron.

6. A welding product fabricated using the high-entropy alloy of claim 1.

7. The welding product of claim 6, wherein the welding product is fabricated using a cored-wire manufacturing process.

8. The high-entropy alloy of claim 7, wherein the cored-wire manufacturing process comprises an alloyed strip formed around the high-entropy alloy in powder, ground or crushed form.

\* \* \* \* \*